(12) United States Patent
Lee et al.

(10) Patent No.: US 12,380,396 B2
(45) Date of Patent: **\*Aug. 5, 2025**

(54) CENTRAL MANAGEMENT SERVER, UNMANNED CARGO AIRCRAFT AND UNMANNED DELIVERY ROBOT FOR DELIVERING GOODS CONSIDERING STATUS OF LOCAL DELIVERY HUB

(71) Applicants: HYUNDAI MOTOR COMPANY, Seoul (KR); KIA CORPORATION, Seoul (KR)

(72) Inventors: Ji A Lee, Seoul (KR); Jong Min Oh, Hwaseong-si (KR); Ji Min Han, Anyang-si (KR); Ki Seok Sung, Seongnam-si (KR); Jong Kyu Choi, Yongin-si (KR); Young Jun Byun, Seoul (KR); Kye Yoon Kim, Gunpo-si (KR); Jae Hoon Chung, Seoul (KR)

(73) Assignees: HYUNDAI MOTOR COMPANY, Seoul (KR); KIA CORPORATION, Seoul (KR)

( \* ) Notice: Subject to any disclaimer, the term of this patent is extended or adjusted under 35 U.S.C. 154(b) by 217 days.

This patent is subject to a terminal disclaimer.

(21) Appl. No.: 17/826,985

(22) Filed: May 27, 2022

(65) Prior Publication Data

US 2023/0222432 A1 Jul. 13, 2023

(30) Foreign Application Priority Data

Jan. 10, 2022 (KR) ........................ 10-2022-0003241

(51) Int. Cl.
*G06Q 10/0832* (2023.01)
*B64U 10/13* (2023.01)
(Continued)

(52) U.S. Cl.
CPC ......... *G06Q 10/0832* (2013.01); *B64U 10/13* (2023.01); *G05D 1/0676* (2013.01);
(Continued)

(58) Field of Classification Search
None
See application file for complete search history.

(56) References Cited

U.S. PATENT DOCUMENTS 9,792,576 B1 10/2017 Jamjoom et al.
11,392,130 B1 7/2022 Desrosiers et al.
(Continued)

FOREIGN PATENT DOCUMENTS

JP 2018-513456 A 5/2018
KR 10-2019-0126756 A 11/2019
(Continued)

*Primary Examiner* — George Chen
(74) *Attorney, Agent, or Firm* — Morgan, Lewis & Bockius LLP (57) ABSTRACT

A central management server includes a determination module determining a landable local delivery hub among a plurality of local delivery hubs located within a preset radius centered around a destination, when a location information request for the landable local delivery hub is received from an unmanned cargo aircraft; and a control module configured to transmit a landing command including the location information of the determined landable local delivery hub to the unmanned cargo aircraft, and transmit a task execution command to cause the unmanned cargo aircraft to deliver goods to the destination. The determination module determines the landable local delivery hub, based on a combination of an expected landing standby period of the unmanned cargo aircraft, an expected battery consumption amount of the unmanned cargo aircraft, an expected delivery period of the unmanned delivery robot, and an expected battery consumption amount of the unmanned delivery robot.

20 Claims, 5 Drawing Sheets

(51) Int. Cl.
  *G05D 1/00* (2024.01)
  *G06Q 10/0835* (2023.01)
  *G06Q 10/0836* (2023.01)
  *B64U 50/19* (2023.01)
  *B64U 101/60* (2023.01)

(52) U.S. Cl.
  CPC ....... *G05D 1/104* (2013.01); *G06Q 10/08355* (2013.01); *G06Q 10/0836* (2013.01); *B64U 50/19* (2023.01); *B64U 2101/60* (2023.01)

(56) References Cited

U.S. PATENT DOCUMENTS

| | | |
|---|---|---|
| 11,748,688 B2 | 9/2023 | Ur |
| 11,879,745 B2 | 1/2024 | Dudar et al. |
| 2015/0370251 A1 | 12/2015 | Siegel et al. |
| 2016/0196756 A1 | 7/2016 | Prakash et al. |
| 2018/0224867 A1* | 8/2018 | Yu .................... B60P 3/007 |
| 2019/0012636 A1* | 1/2019 | Simon ................ G08G 5/0043 |
| 2019/0043370 A1 | 2/2019 | Mulhall et al. |
| 2019/0206264 A1 | 7/2019 | Todasco et al. |
| 2020/0019925 A1 | 1/2020 | Tokhtabaev |
| 2020/0191581 A1 | 6/2020 | Chun |
| 2020/0286033 A1 | 9/2020 | Ur |
| 2020/0302382 A1 | 9/2020 | Gu et al. |
| 2020/0356114 A1 | 11/2020 | Uçar et al. |
| 2021/0065108 A1* | 3/2021 | Gabbai .................. G08G 5/006 |
| 2021/0073715 A1* | 3/2021 | Yamada ................ B64D 27/24 |
| 2021/0132625 A1 | 5/2021 | Gillett |
| 2021/0208603 A1 | 7/2021 | Tazume et al. |

FOREIGN PATENT DOCUMENTS

| | | |
|---|---|---|
| KR | 10-2095735 B1 | 4/2020 |
| KR | 10-2020-0097482 A | 8/2020 |
| KR | 10-2190968 B1 | 12/2020 |
| KR | 10-2206749 B1 | 1/2021 |
| KR | 10-2282360 B1 | 7/2021 |
| KR | 10-2288037 B1 | 8/2021 |
| KR | 10-2304951 B1 | 9/2021 |
| WO | 2016/140988 A1 | 9/2016 |

* cited by examiner

CENTRAL MANAGEMENT SERVER, UNMANNED CARGO AIRCRAFT AND UNMANNED DELIVERY ROBOT FOR DELIVERING GOODS CONSIDERING STATUS OF LOCAL DELIVERY HUB

CROSS-REFERENCE TO RELATED APPLICATION(S)

This application claims benefit of priority to Korean Patent Application No. 10-2022-0003241 filed on Jan. 10, 2022 in the Korean Intellectual Property Office, the disclosure of which is incorporated herein by reference in its entirety.

TECHNICAL FIELD

The present disclosure relates to a central management server, an unmanned cargo aircraft, and an unmanned delivery robot, for delivering goods considering a status of a local delivery hub.

BACKGROUND

Recently, research and development of an unmanned cargo aircraft or an unmanned delivery robot, transporting a large number of cargoes by autonomous driving are being conducted. Therefore, when goods are delivered by linking such an unmanned cargo aircraft and such an unmanned delivery robot, the goods may be delivered in a vast region and a delivery period thereof may be shortened, so that consumers may receive a high-quality delivery service.

However, when such an unmanned cargo aircraft should wait for a long time due to traffic of a local delivery hub on which the unmanned cargo aircraft wants to land, there may be a problem that not only the delivery period thereof is prolonged, but also the battery consumption thereof increases due to hovering during a standby period.

SUMMARY

An aspect of the present disclosure is to provide a central management server, an unmanned cargo aircraft, and an unmanned delivery robot, for delivering goods considering a status of a local delivery hub, in which a high-quality delivery service may be provided by shortening a delivery period and reducing battery consumption due to hovering during a standby period thereof.

According to an aspect of the present disclosure, a central management server for delivering goods considering a status of a local delivery hub, includes a determination module determining a landable local delivery hub among a plurality of local delivery hubs located within a preset radius centered in a destination, when a location information request for a landable local delivery hub is received from an unmanned cargo aircraft; and a control module configured to transmit a landing command including a location information of the determined landable local delivery hub to the unmanned cargo aircraft, and transmit a task execution command to cause an unmanned delivery robot to deliver goods loaded in the unmanned cargo aircraft to the destination. The determination module determines a landable local delivery hub among the plurality of local delivery hubs, based on a combination of an expected landing standby period of the unmanned cargo aircraft for which the unmanned cargo aircraft should wait for landing, an expected battery consumption amount of the unmanned cargo aircraft to be consumed during the expected landing standby period, an expected delivery period of the unmanned delivery robot required to deliver the goods loaded in the unmanned cargo aircraft to the destination according to the task execution command, and an expected battery consumption amount of the unmanned delivery robot to be consumed during the expected delivery period.

According to another aspect of the present disclosure, an unmanned cargo aircraft for delivering goods considering a status of a local delivery hub, includes a task execution module configured to transmit a landing permission request to a local delivery hub management server managing a local delivery hub to be landed, wherein a destination to which goods are to be delivered is present in a coverage region to which the local delivery hub belongs; and a control module configured to transmit a location information request for a landable local delivery hub, when a landing standby command is received from the local delivery hub management server in response to the landing permission request. When a landing command including location information on a landable local delivery hub, among a plurality of local delivery hubs, is received in response to the location information request, the task execution module is configured to control the unmanned cargo aircraft to land on the landable local delivery hub having the location information, according to the received landing command. Goods loaded in the unmanned cargo aircraft are delivered to the destination by an unmanned delivery robot according to a task execution command. The landable local delivery hub is determined based on a combination of an expected landing standby period of the unmanned cargo aircraft for which the unmanned cargo aircraft should wait for landing, an expected battery consumption amount of the unmanned cargo aircraft to be consumed during the expected landing standby period, an expected delivery period of the unmanned delivery robot required to deliver the goods loaded in the unmanned cargo aircraft to the destination according to the task execution command, and an expected battery consumption amount of the unmanned delivery robot to be consumed during the expected delivery period.

According to another aspect of the present disclosure, an unmanned delivery robot for delivering goods considering a status of a local delivery hub, includes a task execution module for delivering goods loaded in an unmanned cargo aircraft to a destination according to a task execution command. The unmanned cargo aircraft lands according to location information of a landable local delivery hub among a plurality of local delivery hubs. The landable local delivery hub is determined based on a combination of an expected landing standby period of the unmanned cargo aircraft for which the unmanned cargo aircraft should wait for landing, an expected battery consumption amount of the unmanned cargo aircraft to be consumed during the expected landing standby period, an expected delivery period of the unmanned delivery robot required to deliver the goods loaded in the unmanned cargo aircraft to the destination according to the task execution command, and an expected battery consumption amount of the unmanned delivery robot to be consumed during the expected delivery period.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Hereinafter, embodiments of the present disclosure will be described with reference to the accompanying drawings. However, the embodiments of the present disclosure may be modified in various other forms, and the scope of the present disclosure is not limited only to embodiments described below. Shapes and sizes of elements in the drawings may be exaggerated for clarity, and elements indicated by the same reference numerals in the drawings may be the same elements.

Figure 1:
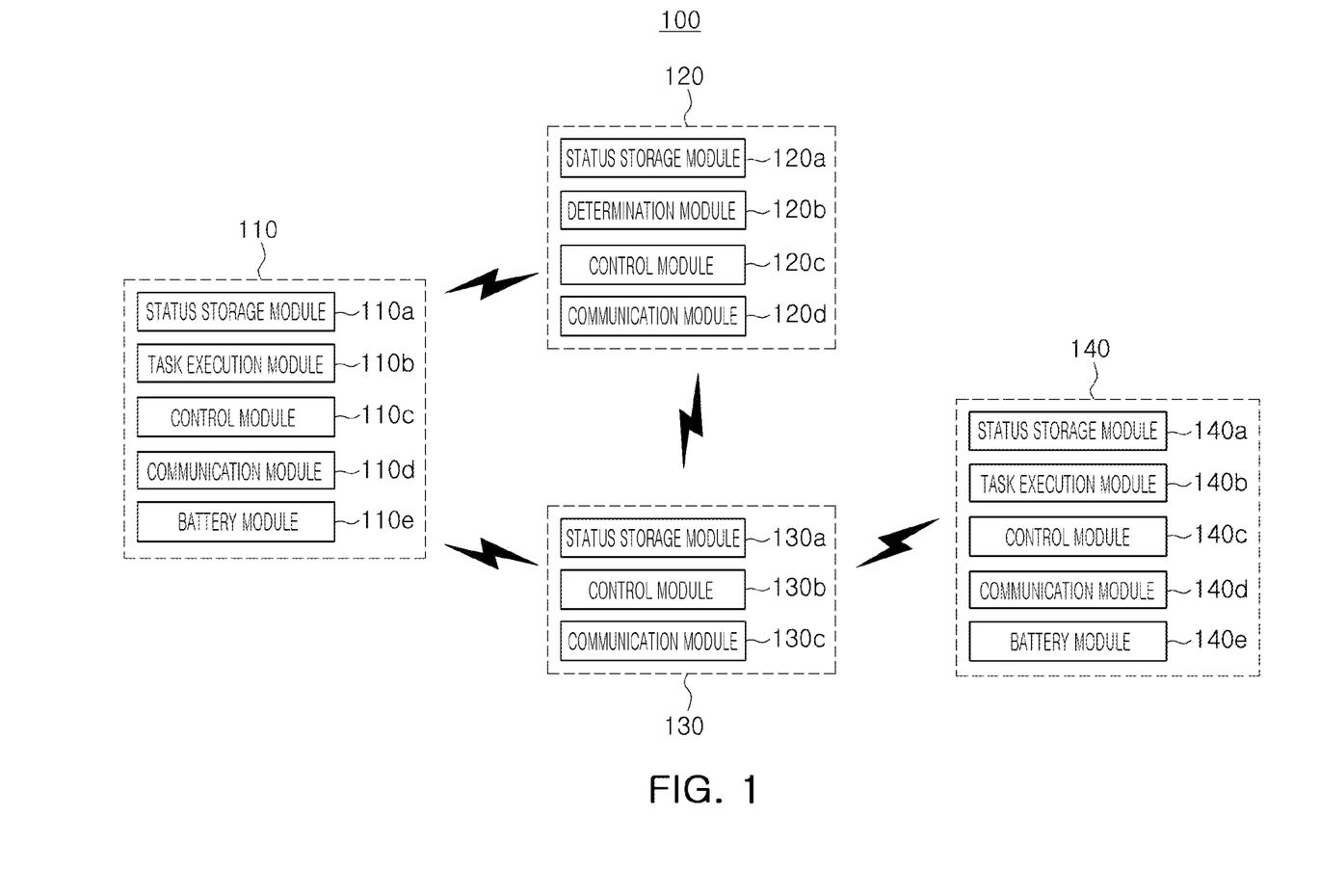
FIG. 1 is a configuration diagram illustrating a delivery management system including an unmanned cargo aircraft, a central management server, a local delivery hub management server, and an unmanned delivery robot, for delivering goods considering a status of a local delivery hub, according to an embodiment of the present disclosure.

FIG. 1 is a configuration diagram illustrating a delivery management system 100 including an unmanned cargo aircraft 110, a central management server 120, a local delivery hub management server 130, and an unmanned delivery robot 140, for delivering goods considering a status of a local delivery hub, according to an embodiment of the present disclosure.

Figure 2:
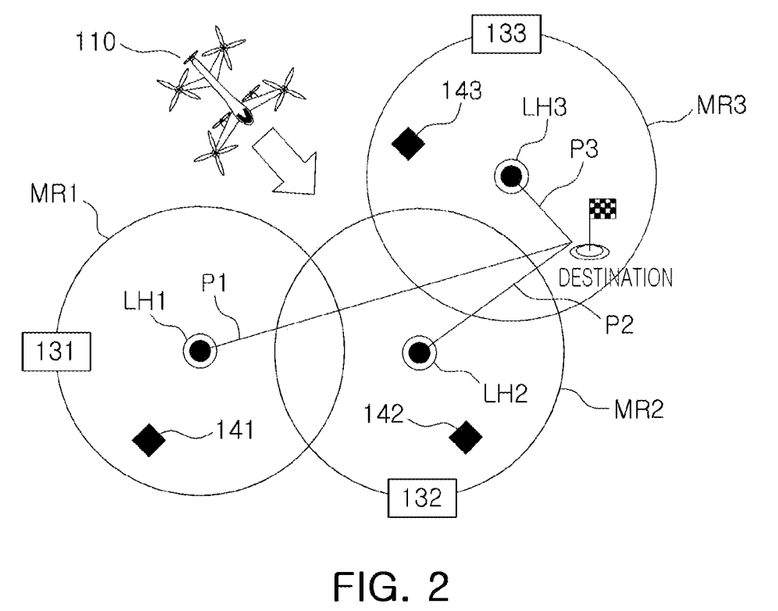
FIG. 2 is a view illustrating a process of determining a landable local delivery hub among a plurality of local delivery hubs based on individual delivery, according to an embodiment of the present disclosure.
Figure 3:
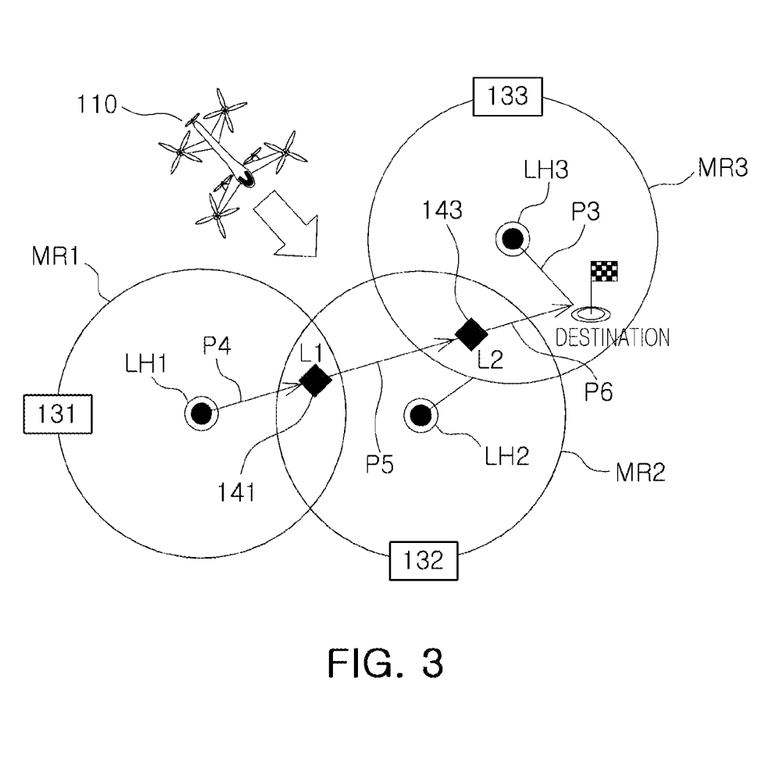
FIG. 3 is a view illustrating relay delivery according to an embodiment of the present disclosure.

FIG. 2 is a view illustrating a process of determining a landable local delivery hub among a plurality of local delivery hubs based on individual delivery, according to an embodiment of the present disclosure, and FIG. 3 is a view illustrating relay delivery according to an embodiment of the present disclosure.

Hereinafter, with reference to FIGS. 1 to 3, an operation of a delivery management system 100 including an unmanned cargo aircraft 110, a central management server 120, a local delivery hub management server 130, and an unmanned delivery robot 140, for delivering goods considering a status of a local delivery hub will be described.

In the present disclosure, the local delivery hub may be a landing point on which the unmanned cargo aircraft 110 may land, and may refer to an intermediate base capable of delivering goods loaded in the unmanned cargo aircraft 110 to the unmanned delivery robot 140.

In addition, in the present disclosure, goods may include various types of documents (e.g., a copy of a bankbook, a contract, a company document, or the like), which may be delivered by a registered mail service, or the like, as well as an item such as an item of clothing, an umbrella, a book, or the like, which may be ordered by a user.

In addition, as illustrated in FIG. 2, the local delivery hub may be provided as a plurality of local delivery hubs LH1 to LH3, coverage regions MR1 to MR3, which are preset, may be set around the plurality of local delivery hubs LH1 to LH3, respectively, and unmanned delivery robots 141 to 143 for delivering goods and local delivery hub management servers 131 to 133 for managing a takeoff and landing status of the local delivery hubs LH1 to LH3 may be provided in each of the coverage regions MR1 to MR3.

In the present disclosure, although it is illustrated that one of the unmanned delivery robots 141 to 143 is provided in each coverage region MR1 to MR3, two or more unmanned delivery robots may be provided in one coverage region. Also, the number of unmanned delivery robots may be the same or different for each coverage region. In addition, although the coverage regions MR1 to MR3, described above, are illustrated to be in a circle having regions overlapping adjacent coverage regions, various shapes such as a grid type or the like may be provided.

In addition, in the present disclosure, the individual delivery may mean that an unmanned delivery robot existing in a coverage region to which a local delivery hub on which an unmanned cargo aircraft lands belongs directly delivers goods loaded in the unmanned cargo aircraft to a destination.

In addition, in the present disclosure, the relay delivery may mean delivery of goods loaded in an unmanned cargo aircraft to a destination through delivery of the goods between unmanned delivery robots existing in coverage regions to which different local delivery hubs belong.

First, as illustrated in FIG. 1, a delivery management system 100 may include an unmanned cargo aircraft 110, a central management server 120, a local delivery hub management server 130, and an unmanned delivery robot 140.

The unmanned cargo aircraft 110 may include a status storage module 110a, a task execution module 110b, a control module 110c, a communication module 110d, and a battery module 110e.

The status storage module 110a may store status information of the unmanned cargo aircraft 110 including current location information, route information, and battery information, and the stored status information may be transmitted to the central management server 120 in real time through the communication module 110d.

The task execution module 110b may set a flight route, and may control flight and landing of the unmanned cargo aircraft 110 to land at a local delivery hub along the set flight route. To this end, the task execution module 110b may include, for example, a GPS module, a navigation module, a propeller, a driving motor, or the like.

Also, the task execution module 110b may transmit a landing permission request to the local delivery hub management server 130 managing a local delivery hub to be landed.

In addition, when the task execution module 110b receives a landing command including location information of a landable local delivery hub from the central management server 120, the task execution module 110b may land the unmanned cargo aircraft 110 on the local delivery hub having the location information included in the landing command.

When the control module 110c receives a landing standby command from the local delivery hub management server 130 to be landed, the control module 110c may transmit a location information request for a landable local delivery hub to the central management server 120.

In addition, when the control module 110c receives a request for an expected battery consumption amount due to hovering during an expected landing standby period from the central management server 120, the control module 110c may calculate the expected battery consumption amount and may then transmit the calculated expected battery consumption to the central management server 120 through the communication module 110*d*.

The communication module 110*d* may include a wireless interface for transmitting and receiving various data with the central management server 120 and the local delivery hub management server 130.

The battery module 110*e* may be a module for supplying power to the task execution module 110*b* described above, and various types of batteries such as a lithium ion battery, an all-solid-state battery, or the like may be used as the battery module 110*e*.

The central management server 120 may include a status storage module 120*a*, a determination module 120*b*, a control module 120*c*, and a communication module 120*d*.

The status storage module 120*a* may store status information of the unmanned cargo aircraft 110 transmitted from the aforementioned unmanned cargo aircraft 110, status information of the unmanned delivery robot 140 transmitted from the local delivery hub management server 130 to be described later, and status information of the local delivery hub.

The determination module 120*b* may determine a landable local delivery hub among a plurality of local delivery hubs located within a preset radius around a destination, when a location information request for the landable local delivery hub is received from the unmanned cargo aircraft 110. The determined location information of the local delivery hub may be transmitted to the control module 120*c*.

Specifically, the determination module 120*b* may determine a landable local delivery hub among a plurality of local delivery hubs, based on a combination of an expected landing standby period of the unmanned cargo aircraft 110 for which the unmanned cargo aircraft 110 should wait for landing the unmanned cargo aircraft 110, an expected battery consumption amount of the unmanned cargo aircraft 110 to be consumed during the expected landing standby period, an expected delivery period of the unmanned delivery robot required to deliver goods loaded in the unmanned cargo aircraft 110 to a destination, and an expected battery consumption amount of the unmanned delivery robot to be consumed during the expected delivery period, calculated for each of the plurality of local delivery hubs. In a non-limiting example, each parameter to determine the combination may be determined to have a score based on a value of the parameter, and the combination may be determined based on a sum of the scores. The relation between a score and a value of a respective parameter may be determined based on experimental data or be trained through during operations, or may be preset by the manufacturer or owner of the delivery management system 100.

Hereinafter, a process of determining a landable local delivery hub among a plurality of local delivery hubs will be described in detail with reference to FIG. 2.

FIG. 2 is a view illustrating a process of determining a landable local delivery hub among a plurality of local delivery hubs based on individual delivery, according to an embodiment of the present disclosure.

As illustrated in FIG. 2, a determination module 120*b* may perform the following for each of the plurality of local delivery hubs LH1 to LH3.

First, the determination module 120*b* may calculate an expected landing standby period of the unmanned cargo aircraft 110 with respect to a local delivery hub LH1, and may calculate an expected battery consumption amount of the unmanned cargo aircraft 110 to be consumed during the expected landing standby period. Thereafter, an expected delivery period of an unmanned delivery robot 141 existing in a coverage region MR1 to which the local delivery hub LH1 belongs, required for the unmanned delivery robot 141, to deliver goods loaded in the unmanned cargo aircraft 110 that landed on the local delivery hub LH1 to the destination, and an expected battery consumption amount of the unmanned delivery robot 141 to be consumed during the expected delivery period may be calculated.

Next, the determination module 120*b* may calculate an expected landing standby period of the unmanned cargo aircraft 110 with respect to a local delivery hub LH2, and may calculate an expected battery consumption amount of the unmanned cargo aircraft 110 to be consumed during the expected landing standby period. Thereafter, an expected delivery period of an unmanned delivery robot 142 existing in a coverage region MR2 to which the local delivery hub LH2 belongs, required for the unmanned delivery robot 142, to deliver goods loaded in the unmanned cargo aircraft 110 that landed on the local delivery hub LH2 to the destination, and an expected battery consumption amount of the unmanned delivery robot 142 to be consumed during the expected delivery period may be calculated.

Next, the determination module 120*b* may calculate an expected landing standby period of the unmanned cargo aircraft 110 with respect to a local delivery hub LH3, and may calculate an expected battery consumption amount of the unmanned cargo aircraft 110 to be consumed during the expected landing standby period. Thereafter, an expected delivery period of an unmanned delivery robot 143 existing in a coverage region MR3 to which the local delivery hub LH3 belongs, required for the unmanned delivery robot 143, to deliver goods loaded in the unmanned cargo aircraft 110 that landed on the local delivery hub LH3 to the destination, and an expected battery consumption amount of the unmanned delivery robot 143 to be consumed during the expected delivery period may be calculated.

Thereafter, the determination module 120*b* may determine a local delivery hub having the smallest sum of the expected landing standby period of the unmanned cargo aircraft 110 and the expected delivery period of the unmanned delivery robot (131 to 133), among the plurality of local delivery hubs LH1 to LH3, as the landable local delivery hub.

Alternatively, the determination module 120*b* may determine a local delivery hub having the smallest sum of the expected battery consumption amount of the unmanned cargo aircraft 110 and the expected battery consumption amount of the unmanned delivery robot (131 to 133), among the plurality of local delivery hubs LH1 to LH3, as the landable local delivery hub. In FIG. 2, reference numeral 131 denotes a local delivery hub management server that manages the local delivery hub LH1, reference numeral 132 denotes a local delivery hub management server that manages the local delivery hub LH2, and reference numeral 133 denotes a local delivery hub management server that manages the local delivery hub LH3.

Thereafter, a control module 120*c* may be configured to transmit a landing command including location information of the determined local delivery hub to the unmanned cargo aircraft 110, and transmit a task execution command for delivering goods loaded in the unmanned cargo aircraft 110 to the local delivery hub management server 130.

For example, when the task execution command is an individual delivery command, the control module 120*c* may transmit the individual delivery command to a local delivery hub management server that manages the determined local delivery hub. The above-described individual delivery command may include location information of the determined local delivery hub, location information of the destination, and unique identification information of an unmanned delivery robot by which the goods are delivered.

For example, as illustrated in FIG. 2, when the determined local delivery hub is the local delivery hub LH1, the control module 120c may transmit the individual delivery command to the local delivery hub management server 131 managing the local delivery hub LH1. Thereafter, the unmanned delivery robot 141 managed by the local delivery hub management server 131 may deliver the goods loaded on the unmanned cargo aircraft 110 that landed on the local delivery hub LH1 to the destination along a set route P1.

When the determined local delivery hub is the local delivery hub LH2, the control module 120c may transmit the individual delivery command to the local delivery hub management server 132 managing the local delivery hub LH2. Thereafter, the unmanned delivery robot 142 managed by the local delivery hub management server 132 may deliver the goods loaded on the unmanned cargo aircraft 110 that landed on the local delivery hub LH2 to the destination along a set route P2.

When the determined local delivery hub is the local delivery hub LH3, the control module 120c may transmit the individual delivery command to the local delivery hub management server 133 managing the local delivery hub LH3. Thereafter, the unmanned delivery robot 143 managed by the local delivery hub management server 133 may deliver the goods loaded in the unmanned cargo aircraft 110 that landed on the local delivery hub LH3 to the destination along a set route P3.

For example, when the task execution command is a relay delivery command, the control module 120c may transmit the relay delivery command to local delivery hub management servers involved in relay delivery. In this case, the relay delivery command may include location information of a first point, location information of a second point, and unique identification information of an unmanned delivery robot by which goods are delivered in relay.

FIG. 3 is a view illustrating relay delivery according to an embodiment of the present disclosure.

When a determined local delivery hub is a local delivery hub LH1, the control module 120c may transmit a relay delivery command to a local delivery hub management server 131 for managing the local delivery hub LH1, a local delivery hub management server 132 for managing a local delivery hub LH2, and a local delivery hub management server 133 for managing a local delivery hub LH3.

In this case, the relay delivery command may include location information of a first point, location information of a second point, and unique identification information of an unmanned delivery robot by which goods are delivered in relay.

The above-described first point may be a point in a boundary region or an overlapping region between a previous coverage region and a current coverage region, and the first point may be a landable local delivery hub, when the first point is within a coverage region to which the landable local delivery hub belongs.

In addition, the above-described second point may be a point in a boundary region or an overlapping region between the current coverage region and the next coverage region, and the second point may be a destination, when the second point is within a coverage region to which the destination belongs. When the first point and the second point may be present on a route set from the determined local delivery hub to the destination.

For example, a control module 120c may transmit a relay delivery command including location information of a first point (e.g., LH1), location information of a second point (e.g., L1), and unique identification information of an unmanned delivery robot 141 by which goods are delivered in relay, to the local delivery hub management server 131.

In addition, the control module 120c may transmit a relay delivery command including location information of a first point (e.g., L1), location information of a second point (e.g., L2), and unique identification information of an unmanned delivery robot 142 by which goods are delivered in relay, to the local delivery hub management server 132.

Similarly, the control module 120c may transmit a relay delivery command including location information of a first point (e.g., L2), location information of a second point (e.g., the destination), and unique identification information of an unmanned delivery robot 143 by which goods are delivered in relay, to the local delivery hub management server 133.

Thereafter, the unmanned delivery robot 141 managed by the local delivery hub management server 131 may deliver goods loaded on the unmanned cargo aircraft 110 that landed on the local delivery hub LH1 along a route P4 to the point L1, the unmanned delivery robot 142 managed by the local delivery hub management server 132 may receive the goods from the unmanned delivery robot 141 at the point L1 along a route P5 and may deliver the goods to the point L2, and the unmanned delivery robot 143 managed by the hub management server 133 may receive the goods from the unmanned delivery robot 142 at the point L2 along a route P6 and may deliver the goods to the destination.

In the relay delivery described above, when the unmanned delivery robot 142 existing in a coverage region MR2 has goods to be delivered to the destination, and the unmanned delivery robot 143 existing in a coverage region MR3 also has goods to be delivered to the destination, the final unmanned delivery robot 143 may receive and deliver the goods to be delivered by the unmanned delivery robot 141 and the unmanned delivery robot 142 at once. Therefore, it is useful to reduce battery consumption amounts of the unmanned delivery robots 141 to 143.

When a task execution command is a vacancy robot support command, the control module 120c may transmit the vacancy robot support command to a local delivery hub management server supporting an unmanned delivery robot and to a local delivery hub management server supported by an unmanned delivery robot. In this case, the vacancy robot support command may include location information of a local delivery hub to be supported and unique identification information of an unmanned delivery robot to be supported.

For example, when the unmanned delivery robot 141 in the coverage region MR1 in FIG. 2 is absent (for example, when the unmanned delivery robot 141 performs a task), the control module 120c may transmit a vacancy robot support command to the local delivery hub management server 132 supporting the unmanned delivery robot 142 and to the local delivery hub management server 131 supported by the unmanned delivery robot 142. Thereafter, the unmanned delivery robot 142 may move to the coverage region MR1 of the local delivery hub LH1 to be supported, to perform a task.

The communication module 120d may include a wireless interface for transmitting and receiving various data with the unmanned cargo aircraft 110 and the local delivery hub management server 130.

The local delivery hub management server 130 may include a status storage module 130a, a control module 130b, and a communication module 130c.

The status storage module 130a may store status information of the local delivery hub management server 130 including status information of the unmanned delivery robot 140 and status information of the local delivery hub, described later. In this case, the status information of the local delivery hub may include a landing possible status including landing possible or landing standby, and the landing standby may include an expected landing standby period to be waited for landing. The stored status information may be transmitted to the central management server 120 in real time through the communication module 130c.

The control module 130b may receive a landing permission request from the unmanned cargo aircraft 110. Thereafter, when the status information of the local delivery hub is waiting for landing, a landing standby command including the expected landing standby period may be transmitted to the unmanned cargo aircraft 110.

Also, the control module 130b may receive a task execution command from the central management server 120, and may transmit the received task execution command to the unmanned delivery robot 140.

In addition, when the control module 130b receives a request for an expected delivery period and an expected battery consumption amount from the central management server 120, the control module 130b may transmit the request to the unmanned delivery robot 140. Thereafter, when the control module 130b receives the expected delivery period and the expected battery consumption amount from the unmanned delivery robot 140, the control module 130b may transmit them to the central management server 120.

The communication module 130c may include a wireless interface for transmitting and receiving various data with the central management server 120 and the unmanned cargo aircraft 110.

The unmanned delivery robot 140 may include a status storage module 140a, a task execution module 140b, a control module 140c, a communication module 140d, and a battery module 140e, and may delivery goods to a destination according to a task execution command.

The above-described unmanned delivery robot 140 may be a mobile body that autonomously travels on the ground according to a preset route using a driving device including a wheel, a quadruped, or the like, and receives and transports goods from the unmanned cargo aircraft 110 or other unmanned delivery robot.

Specifically, the status storage module 140a may store status information of the unmanned delivery robot 140 including unique identification information, current location information, task execution information, and battery information. In this case, the task execution information may include task execution status (e.g., yes or no), a type of task being performed (e.g., individual delivery, relay delivery, vacancy robot support), and an estimated execution time period required to perform a task. The stored status information may be transmitted to the local delivery hub management server 130 in real time through the communication module 140d.

The task execution module 140b may set a movement route, and may move the unmanned delivery robot 140 along the set movement route. To this end, the task execution module 140b may include, for example, a GPS module, a navigation module, a wheel or quadruped, or the like, and a driving motor for driving the same.

When the control module 140c receives a request for an expected delivery period and a request for an expected battery consumption amount from the local delivery hub management server 130, the control module 140c may calculate the expected delivery period and the expected battery consumption amount, and may then transmit the calculated expected battery consumption amount to the local delivery hub management server 130 through the communication module 140d.

Also, the control module 140c may deliver the goods to the destination according to the task execution command.

The communication module 140d may include a wireless interface for transmitting and receiving various data with the local delivery hub management server 130.

The battery module 140e may be a module for supplying power to the task execution module 140b described above, and various types of batteries such as a lithium ion battery, an all-solid-state battery, or the like may be used as the battery module 140e.

As described above, according to an embodiment of the present disclosure, when an unmanned cargo aircraft should wait due to traffic of a local delivery hub to which the unmanned cargo aircraft wants to land, a landable local delivery hub among a plurality of local delivery hubs may be determined, based on a combination of an expected landing standby period of the unmanned cargo aircraft for which the unmanned cargo aircraft should wait for landing the unmanned cargo aircraft, an expected battery consumption amount of the unmanned cargo aircraft to be consumed during the expected landing standby period, an expected delivery period of the unmanned delivery robot required to deliver the goods loaded in the unmanned cargo aircraft to the destination according to the task execution command, and an expected battery consumption amount of the unmanned delivery robot to be consumed during the expected delivery period, to shorten a delivery period and reduce a battery consumption amount due to hovering during a standby period thereof, to provide a high-quality delivery service. In a non-limiting example, each parameter to determine such a combination may be determined to have a score based on a value of the parameter, and the combination may be determined based on a sum of the scores. The relation between a score and a value of a respective parameter may be determined based on experimental data or be trained through during operations, or may be preset by the manufacturer or owner of the delivery management system 100.

Figure 4:
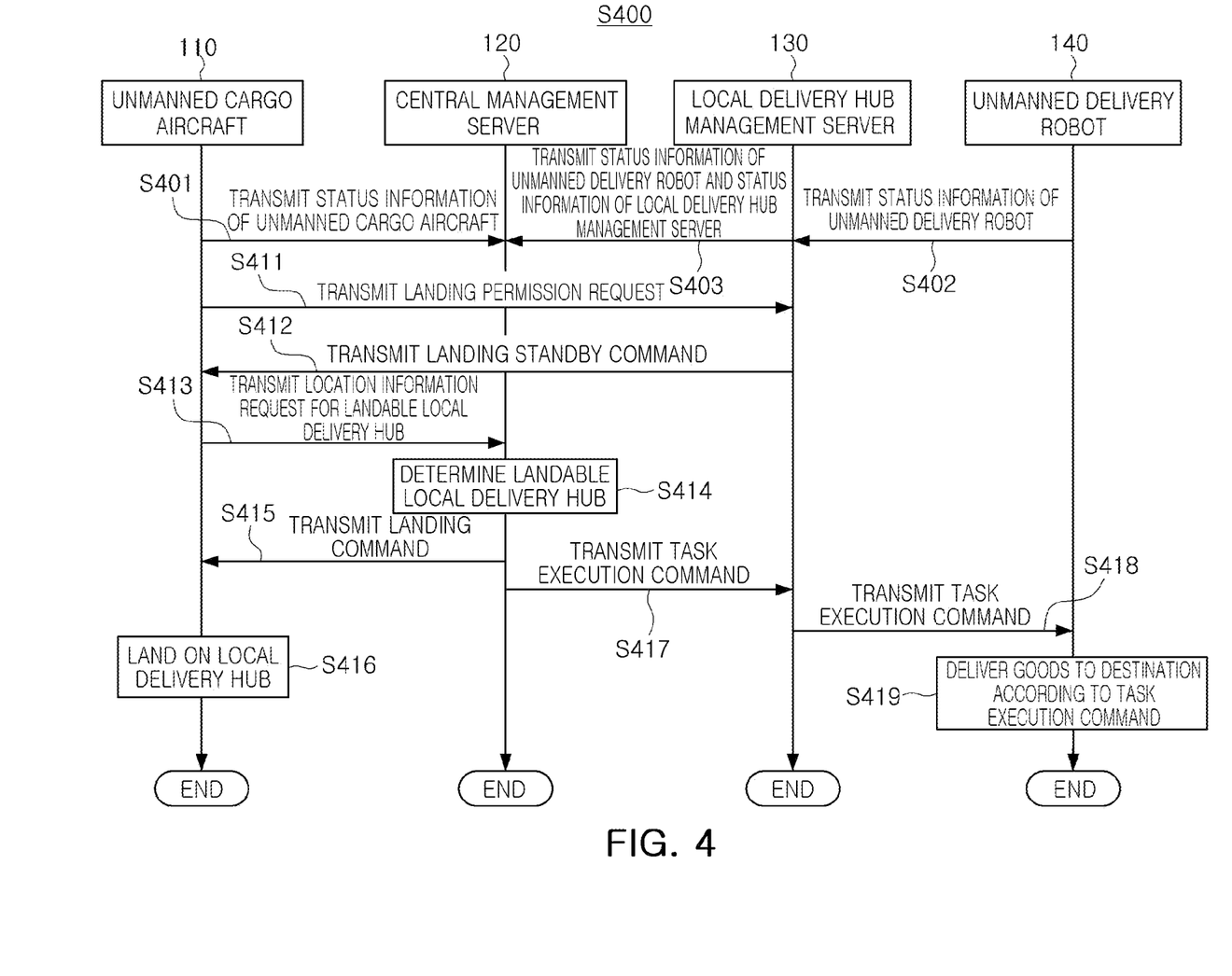
FIG. 4 is a flowchart illustrating a method for delivering goods considering a status of a local delivery hub, according to an embodiment of the present disclosure.
Figure 5:
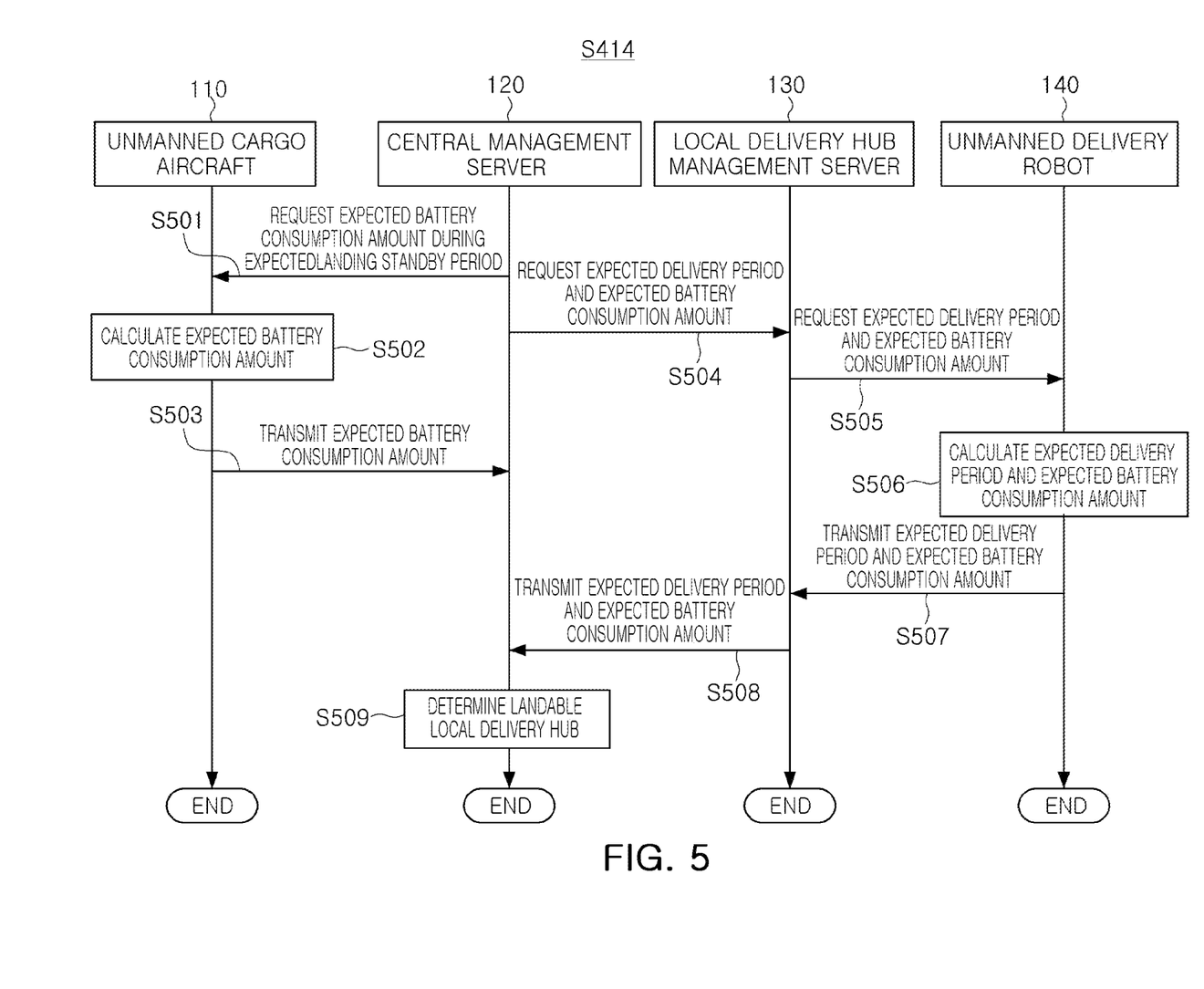
FIG. 5 is a flowchart implementing S414 of FIG. 4.

FIG. 4 is a flowchart illustrating a method for delivering goods considering a status of a local delivery hub, according to an embodiment of the present disclosure. FIG. 5 is a flowchart implementing S414 of FIG. 4.

Hereinafter, a method (S400) for delivering goods considering a status of a local delivery hub, according to an embodiment of the present disclosure, will be described with reference to FIGS. 1 to 5. However, descriptions overlapping those of FIGS. 1 to 3 will be omitted for simplification of the present disclosure.

First, as illustrated in FIG. 4, an unmanned cargo aircraft 110 may store status information of the unmanned cargo aircraft 110 including current location information, route information, and battery information, and may transmit the stored status information to a central management server 120 in real time (S401).

Similarly, an unmanned delivery robot 140 may store status information of the unmanned delivery robot 140 including unique identification information, current location information, task execution information, and battery information, and may transmit the stored status information in real time to a local delivery hub management server 130 (S402).

Similarly, the local delivery hub management server 130 may store status information of the unmanned delivery robot 140, and status information of the local delivery hub management server 130 including status information of a local delivery hub, and may transmit the stored status information in real time to the central management server 120 (S403).

The unmanned cargo aircraft 110 may transmit a landing permission request to the local delivery hub management server 130 managing a local delivery hub to be landed (S411).

Thereafter, the local delivery hub management server 130 receiving the landing permission request may transmit a landing standby command including an expected landing standby period to the unmanned cargo aircraft 110, when status information of the local delivery hub denotes landing standby (S412).

Thereafter, the unmanned cargo aircraft 110 in which the landing standby command is received may transmit a location information request for a landable local delivery hub to the central management server 120 (S413).

Thereafter, the central management server 120 in which the location information request for the landable local delivery hub is received may determine a landable local delivery hub, among a plurality of local delivery hubs located within a preset radius around a destination (S414).

Specifically, the central management server 120 may determine a landable local delivery hub among a plurality of local delivery hubs, based on a combination of an expected landing standby period of the unmanned cargo aircraft 110 for which the unmanned cargo aircraft 110 should wait for landing the unmanned cargo aircraft 110, an expected battery consumption amount of the unmanned cargo aircraft 110 to be consumed during the expected landing standby period, an expected delivery period of the unmanned delivery robot required to deliver goods loaded in the unmanned cargo aircraft 110 to a destination, and an expected battery consumption amount of the unmanned delivery robot to be consumed during the expected delivery period, calculated for each of the plurality of local delivery hubs.

Hereinafter, a process (S414) of determining a landable local delivery hub, among a plurality of local delivery hubs, will be described with reference to FIG. 5.

As illustrated in FIG. 5, the central management server 120 may request an expected battery consumption amount of the unmanned cargo aircraft 110 to be consumed during the expected landing standby period for which the unmanned cargo aircraft 110 lands in each of the plurality of local delivery hubs LH1 to LH3, to the unmanned cargo aircraft 110 (S501).

Therefore, the unmanned cargo aircraft 110 may calculate the expected battery consumption amount of the unmanned cargo aircraft 110 consumed during the expected landing standby period (S502), and may transmit the calculated expected battery consumption amount to the central management server 120 (S503).

Next, the central management server 120 may transmit a request for an expected delivery period of the unmanned delivery robot and an expected battery consumption amount of the unmanned delivery robot consumed during the expected delivery period, required to deliver the goods loaded in the unmanned cargo aircraft 110 to the destination, in each of the plurality of local delivery hub management servers 131 to 133 (S504).

Thereafter, the plurality of local delivery hub management servers 131 to 133 may transmit the request for the expected delivery period and the expected battery consumption amount to the unmanned delivery robots 141 to 143 existing in each coverage region (S505).

Thereafter, each of the unmanned delivery robots 141 to 143 may calculate the expected delivery period and the expected battery consumption amount (S506), and may transmit the calculated expected delivery period and the calculated expected battery consumption amount to the central management server 120 through each of the local delivery hub management servers 131 to 133 (S507 and S508).

Thereafter, the central management server 120 may determine a landable local delivery hub among a plurality of local delivery hubs, based on a combination of an expected landing standby period of the unmanned cargo aircraft 110 for which the unmanned cargo aircraft 110 should wait for landing the unmanned cargo aircraft 110, an expected battery consumption amount of the unmanned cargo aircraft 110 to be consumed during the expected landing standby period, an expected delivery period of the unmanned delivery robot required to deliver goods loaded in the unmanned cargo aircraft 110 to a destination, and an expected battery consumption amount of the unmanned delivery robot to be consumed during the expected delivery period, calculated for each of the plurality of local delivery hubs.

Referring to FIG. 4 again, the central management server 120 may transmit a landing command including location information of a landable local delivery hub to the unmanned cargo aircraft 110 (S415), and then the unmanned cargo aircraft 110 may land on a local delivery hub having the location information included in the landing command (S416).

The central management server 120 may transmit a task execution command to the unmanned delivery robot 140 (S417, S418). A task execution command transmitted to the local delivery hub management server 130 may further include a landing command for informing the determined local delivery hub that the unmanned cargo aircraft 110 is scheduled to land, and the local delivery hub management server 130 receiving the landing command may be appropriately prepared.

For example, when the task execution command is an individual delivery command, the central management server 120 may transmit the individual delivery command to a local delivery hub management server that manages the determined local delivery hub. The above-described individual delivery command may include location information of the determined local delivery hub, location information of the destination, and unique identification information of an unmanned delivery robot by which the goods are delivered.

For example, when the task execution command is a relay delivery command, the central management server 120 may transmit the relay delivery command to local delivery hub management servers involved in relay delivery. In this case, the relay delivery command may include location information of a first point, location information of a second point, and unique identification information of an unmanned delivery robot by which goods are delivered in relay, as described above.

For example, when the task execution command is a vacancy robot support command, the central management server 120 may transmit the vacancy robot support command to a local delivery hub management server supporting an unmanned delivery robot and to a local delivery hub management server supported by an unmanned delivery robot. In this case, the vacancy robot support command may include location information of a local delivery hub to be supported and unique identification information of an unmanned delivery robot to be supported.

Thereafter, the unmanned delivery robot 140 may deliver the goods to the destination according to the task execution command (S419).

As described above, according to an embodiment of the present disclosure, when an unmanned cargo aircraft should wait due to traffic of a local delivery hub to which the unmanned cargo aircraft wants to land, a landable local delivery hub among a plurality of local delivery hubs may be determined, based on a combination of an expected landing standby period of the unmanned cargo aircraft for which the unmanned cargo aircraft should wait for landing the unmanned cargo aircraft, an expected battery consumption amount of the unmanned cargo aircraft to be consumed during the expected landing standby period, an expected delivery period of the unmanned delivery robot required to deliver the goods loaded in the unmanned cargo aircraft to the destination according to the task execution command, and an expected battery consumption amount of the unmanned delivery robot to be consumed during the expected delivery period, to shorten a delivery period and reduce a battery consumption amount due to hovering during a standby period thereof, to provide a high-quality delivery service.

Figure 6:
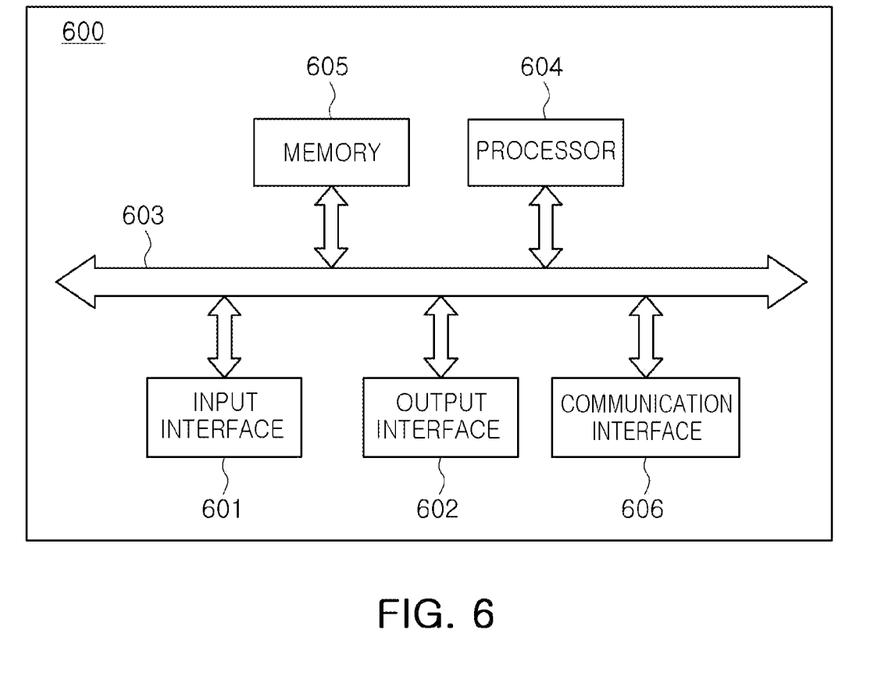
FIG. 6 is a block diagram of a computer device that may fully or partially implement an unmanned cargo aircraft, a central management server, a local delivery hub management server, and an unmanned delivery robot, for delivering goods considering a status of a local delivery hub, according to an embodiment of the present disclosure.

FIG. 6 is a block diagram of a computer device that may fully or partially implement an unmanned cargo aircraft, a central management server, a local delivery hub management server, and an unmanned delivery robot, for delivering goods considering a status of a local delivery hub, according to an embodiment of the present disclosure, and may be applied to the unmanned cargo aircraft 110, the central management server 120, the local delivery hub management server 130, and the unmanned delivery robot 140, illustrated in FIG. 1.

As illustrated in FIG. 6, the computer device 600 may include an input interface 601, an output interface 602, a processor 604, a memory 605, and a communication interface 606, and the input interface 601, the output interface 602, the processor 604, the memory 605, and the communication interface 606 may be interconnected by a system bus 603.

In an embodiment of the present disclosure, the memory 605 may be used to store a program, an instruction, or a code, and the processor 604 may execute the program, the instruction, or the code stored in the memory 605, may control the input interface 601 to receive a signal, and may control the output interface 602 to transmit a signal. The above-described memory 605 may include a read-only memory and a random access memory, and may provide an instruction and data to the processor 604.

In an embodiment of the present disclosure, it can be understood that the processor 604 may be a central processing unit (CPU), and may be another general-purpose processor, a digital signal processor (DSP), or an application specific integrated circuit (ASIC), a field programmable gate array (FPGA) device or other programmable logic device, a discrete gate or a transistor logic device, a discrete hardware component, or the like. The general-purpose processor may be a microprocessor, or the processor may be any conventional processor or the like.

In an implementation process, the process performed in each device of FIGS. 4 and 5 may be achieved by an integrated logic circuit of hardware in the processor 604 or an instruction in the form of software. The content of the method disclosed in relation to an embodiment of the present disclosure may be implemented to be performed and completed by a hardware processor, or may be implemented to be performed and completed by a combination of hardware and software modules of the processor. The software module may be disposed in a storage medium such as a random access memory, a flash memory, a read-only memory, a programmable read-only memory or an electrically erasable programmable memory, a register, or the like. The storage medium may be located in the memory 605, and the processor 604 may read information from the memory 605, and may implement the contents of the above-described method in combination with hardware. In order to avoid duplication, detailed descriptions thereof will be omitted herein.

According to an embodiment of the present disclosure, when an unmanned cargo aircraft should wait due to traffic of a local delivery hub to which the unmanned cargo aircraft wants to land, a landable local delivery hub among a plurality of local delivery hubs may be determined, based on a combination of an expected landing standby period of the unmanned cargo aircraft for which the unmanned cargo aircraft should wait for landing the unmanned cargo aircraft, an expected battery consumption amount of the unmanned cargo aircraft to be consumed during the expected landing standby period, an expected delivery period of the unmanned delivery robot required to deliver the goods loaded in the unmanned cargo aircraft to the destination according to the task execution command, and an expected battery consumption amount of the unmanned delivery robot to be consumed during the expected delivery period, to shorten a delivery period and reduce a battery consumption amount due to hovering during a standby period thereof, to provide a high-quality delivery service.

While example embodiments have been illustrated and described above, it will be apparent to those skilled in the art that modifications and variations could be made without departing from the scope of the present disclosure as defined by the appended claims.

What is claimed is:

1. A central management server for delivering goods considering a status of a local delivery hub, comprising:
   a determination module determining a landable local delivery hub among a plurality of local delivery hubs located within a preset radius centered around a destination, when a location information request for the landable local delivery hub is received from an unmanned cargo aircraft; and
   a control module configured to transmit a landing command including a location information of the determined landable local delivery hub to the unmanned cargo aircraft, and transmit a task execution command to cause an unmanned delivery robot to deliver goods loaded in the unmanned cargo aircraft to the destination,
   wherein the determination module determines the landable local delivery hub among the plurality of local delivery hubs, based on a combination of an expected landing standby period of the unmanned cargo aircraft for which the unmanned cargo aircraft should wait for landing, an expected battery consumption amount of the unmanned cargo aircraft to be consumed during the expected landing standby period, an expected delivery period of the unmanned delivery robot required to deliver the goods loaded in the unmanned cargo aircraft to the destination according to the task execution command, and an expected battery consumption amount of the unmanned delivery robot to be consumed during the expected delivery period.

2. The central management server of claim 1, wherein the task execution command comprises a relay delivery command for delivering goods to the destination through delivery of the goods between unmanned delivery robots respectively existing in coverage regions to which different local delivery hubs belong, wherein the relay delivery command includes location information of a first point, location information of a second point, and unique identification information of the unmanned delivery robots by which the goods are delivered in relays, and
 according to the received relay delivery command, an unmanned delivery robot receives at the first point the goods from an unmanned delivery robot existing in a previous coverage region, and delivers at the second point the goods to an unmanned delivery robot existing in a next coverage region,
 wherein the first point is a point in a boundary region or an overlapping region between the previous coverage region and a current coverage region, and the first point is the landable local delivery hub, when the first point is within the coverage region to which the landable local delivery hub belongs, and
 the second point is a point in a boundary region or an overlapping region between the current coverage region and the next coverage region, and the second point is the destination, when the second point is within the coverage region to which the destination belongs.

3. The central management server of claim 2, wherein the first point and the second point are present on a route set from the determined landable local delivery hub to the destination.

4. The central management server of claim 1, wherein the determination module determines:
 a local delivery hub having the smallest sum of the expected landing standby period of the unmanned cargo aircraft and the expected delivery period of the unmanned delivery robot, among the plurality of local delivery hubs, as the landable local delivery hub; or
 a local delivery hub having the smallest sum of the expected battery consumption amount of the unmanned cargo aircraft and the expected battery consumption amount of the unmanned delivery robot, among the plurality of local delivery hubs, as the landable local delivery hub.

5. The central management server of claim 1, wherein the task execution command comprises an individual delivery command to cause an unmanned delivery robot existing in a coverage region to which the determined landable local delivery hub belongs to directly deliver goods loaded in the unmanned cargo aircraft to the destination, wherein the individual delivery command includes location information of the determined landable local delivery hub, location information of the destination, and unique identification information of an unmanned delivery robot by which the goods are delivered.

6. The central management server of claim 1, wherein the task execution command comprises a vacancy robot support command to cause an unmanned delivery robot to support to move to a coverage region of a local delivery hub to be supported, wherein the vacancy robot support command includes location information of the local delivery hub to be supported and unique identification information of the unmanned delivery robot to support.

7. The central management server of claim 1, wherein, within a preset coverage region centered in a local delivery hub, there are a local delivery hub management server having jurisdiction over the preset coverage region, and an unmanned delivery robot responsible for delivering goods to a destination in the preset coverage region,
 wherein the unmanned delivery robot is provided as a plurality of unmanned delivery robots, and the number of the plurality of unmanned delivery robots is the same or different for each coverage region.

8. An unmanned cargo aircraft for delivering goods considering a status of a local delivery hub, comprising:
 a task execution module configured to transmit a landing permission request to a local delivery hub management server managing a local delivery hub to be landed, wherein a destination to which goods are to be delivered is present in a coverage region to which the local delivery hub belongs; and
 a control module configured to transmit a location information request for a landable local delivery hub, when a landing standby command is received from the local delivery hub management server in response to the landing permission request,
 wherein, when a landing command including location information on a landable local delivery hub, among a plurality of local delivery hubs, is received in response to the location information request, the task execution module is configured to cause the unmanned cargo aircraft to land on the landable local delivery hub having the location information, according to the received landing command,
 goods loaded in the unmanned cargo aircraft are delivered to the destination by an unmanned delivery robot according to a task execution command, and
 the landable local delivery hub is determined based on a combination of an expected landing standby period of the unmanned cargo aircraft for which the unmanned cargo aircraft should wait for landing, an expected battery consumption amount of the unmanned cargo aircraft to be consumed during the expected landing standby period, an expected delivery period of the unmanned delivery robot required to deliver the goods loaded in the unmanned cargo aircraft to the destination according to the task execution command, and an expected battery consumption amount of the unmanned delivery robot to be consumed during the expected delivery period.

9. The unmanned cargo aircraft of claim 8, wherein the task execution command comprises a relay delivery command for delivering goods to the destination through delivery of the goods between unmanned delivery robots respectively existing in coverage regions to which different local delivery hubs belong, wherein the relay delivery command includes location information of a first point, location information of a second point, and unique identification information of the unmanned delivery robots by which the goods are delivered in relays, and
 according to the received relay delivery command, an unmanned delivery robot receives at the first point the goods from an unmanned delivery robot existing in a previous coverage region, and delivers at the second point the goods to an unmanned delivery robot existing in a next coverage region,
 wherein the first point is a point in a boundary region or an overlapping region between the previous coverage region and a current coverage region, and the first point is the landable local delivery hub, when the first point is within the coverage region to which the landable local delivery hub belongs, and
 the second point is a point in a boundary region or an overlapping region between the current coverage region and the next coverage region, and the second point is the destination, when the second point is within the coverage region to which the destination belongs.

10. The unmanned cargo aircraft of claim 9, wherein the first point and the second point are present on a route set from the determined landable local delivery hub to the destination.

11. The unmanned cargo aircraft of claim 8, wherein the landable local delivery hub is:
   a local delivery hub having the smallest sum of the expected landing standby period of the unmanned cargo aircraft and the expected delivery period of the unmanned delivery robot, among the plurality of local delivery hubs; or
   a local delivery hub having the smallest sum of the expected battery consumption amount of the unmanned cargo aircraft and the expected battery consumption amount of the unmanned delivery robot, among the plurality of local delivery hubs.

12. The unmanned cargo aircraft of claim 8, wherein the task execution command comprises an individual delivery command to cause an unmanned delivery robot existing in a coverage region to which the determined landable local delivery hub belongs to directly deliver goods to the destination, wherein the individual delivery command includes location information of the determined landable local delivery hub, location information of the destination, and unique identification information of the unmanned delivery robot by which the goods are delivered.

13. The unmanned cargo aircraft of claim 8, wherein the task execution command comprises a vacancy robot support command to cause an unmanned delivery robot to support to move to a coverage region of a local delivery hub to be supported, wherein the vacancy robot support command includes location information of the local delivery hub to be supported and unique identification information of the unmanned delivery robot to support.

14. An unmanned delivery robot for delivering goods considering a status of a local delivery hub, comprising:
   a task execution module for delivering goods loaded in an unmanned cargo aircraft to a destination according to a task execution command,
   wherein the unmanned cargo aircraft lands according to location information of a landable local delivery hub among a plurality of local delivery hubs, and
   the landable local delivery hub is determined based on a combination of an expected landing standby period of the unmanned cargo aircraft for which the unmanned cargo aircraft should wait for landing, an expected battery consumption amount of the unmanned cargo aircraft to be consumed during the expected landing standby period, an expected delivery period of the unmanned delivery robot required to deliver the goods loaded in the unmanned cargo aircraft to the destination according to the task execution command, and an expected battery consumption amount of the unmanned delivery robot to be consumed during the expected delivery period.

15. The unmanned delivery robot of claim 14, wherein the task execution command comprises a relay delivery command for delivering goods to the destination through delivery of the goods between unmanned delivery robots respectively existing in coverage regions to which different local delivery hubs belong, wherein the relay delivery command includes location information of a first point, location information of a second point, and unique identification information of the unmanned delivery robots by which the goods are delivered in relays, and
   according to the received relay delivery command, an unmanned delivery robot receives at the first point the goods from an unmanned delivery robot existing in a previous coverage region, and delivers at the second point the goods to an unmanned delivery robot existing in a next coverage region,
   wherein the first point is a point in a boundary region or an overlapping region between the previous coverage region and a current coverage region, and the first point is the landable local delivery hub, when the first point is within the coverage region to which the landable local delivery hub belongs, and
   the second point is a point in a boundary region or an overlapping region between the current coverage region and the next coverage region, and the second point is the destination, when the second point is within the coverage region to which the destination belongs.

16. The unmanned delivery robot of claim 15, wherein the first point and the second point are present on a route set from the determined landable local delivery hub to the destination.

17. The unmanned delivery robot of claim 14, wherein the landable local delivery hub is:
   a local delivery hub having the smallest sum of the expected landing standby period of the unmanned cargo aircraft and the expected delivery period of the unmanned delivery robot, among the plurality of local delivery hubs; or
   a local delivery hub having the smallest sum of the expected battery consumption amount of the unmanned cargo aircraft and the expected battery consumption amount of the unmanned delivery robot, among the plurality of local delivery hubs.

18. The unmanned delivery robot of claim 14, wherein the task execution command comprises an individual delivery command for directly delivering goods to the destination by an unmanned delivery robot existing in a coverage region to which the determined landable local delivery hub belongs, wherein the individual delivery command includes location information of the determined landable local delivery hub, location information of the destination, and unique identification information of an unmanned delivery robot by which the goods are delivered, and
   according to the received individual delivery command, the unmanned delivery robot existing in the coverage region to which the determined landable local delivery hub belongs directly delivers the goods loaded in the unmanned cargo aircraft to the destination.

19. The unmanned delivery robot of claim 14, wherein the task execution command comprises a vacancy robot support command, wherein the vacancy robot support command includes location information of a local delivery hub to be supported and unique identification information of an unmanned delivery robot to support,
   wherein the unmanned delivery robot is moved to a coverage region of the local delivery hub to be supported, according to the vacancy robot support command be.

20. The unmanned delivery robot of claim 14, wherein, within a preset coverage region centered in a local delivery hub, there are a local delivery hub management server having jurisdiction over the preset coverage region, and an unmanned delivery robot responsible for delivering goods to a destination in the preset coverage region, wherein the unmanned delivery robot is provided as a plurality of unmanned delivery robots, and the number of the plurality of unmanned delivery robots is the same or different for each coverage region.

\* \* \* \* \*